United States Patent
Day et al.

(10) Patent No.: US 9,617,753 B2
(45) Date of Patent: Apr. 11, 2017

(54) INFLATABLE TENT ASSEMBLY

(71) Applicants: Buzz Day, New Philadelphia, OH (US); Craig Walker, New Philadelphia, OH (US)

(72) Inventors: Buzz Day, New Philadelphia, OH (US); Craig Walker, New Philadelphia, OH (US)

(*) Notice: Subject to any disclaimer, the term of this patent is extended or adjusted under 35 U.S.C. 154(b) by 0 days.

(21) Appl. No.: 14/834,501

(22) Filed: Aug. 25, 2015

(65) Prior Publication Data
US 2017/0058553 A1    Mar. 2, 2017

(51) Int. Cl.
*E04H 15/02* (2006.01)
*B60P 3/00* (2006.01)
*E04H 15/20* (2006.01)
*B62D 63/08* (2006.01)

(52) U.S. Cl.
CPC ............... *E04H 15/20* (2013.01); *B60P 3/00* (2013.01); *B62D 63/08* (2013.01); *E04H 15/02* (2013.01); *E04H 2015/201* (2013.01); *E04H 2015/206* (2013.01)

(58) Field of Classification Search
CPC ......... E04H 15/02; E04H 15/06; E04H 15/20; E04H 2015/206; B60P 3/32; B60P 3/00; B62D 63/06; B62D 63/08
USPC .......... 135/88.13, 96, 91, 93, 156, 116, 900; 296/161, 163, 168; 280/79.11, 677; 52/79.1, 143, 169.12
See application file for complete search history.

(56) References Cited

U.S. PATENT DOCUMENTS

| | | | | |
|---|---|---|---|---|
| 3,599,651 A | * | 8/1971 | Perry | E04H 15/06 135/139 |
| 4,296,960 A | * | 10/1981 | Winchester | B60P 3/32 135/88.13 |
| 5,331,991 A | | 7/1994 | Nilsson | |
| 5,692,795 A | * | 12/1997 | Mininger | E04H 15/20 135/88.13 |
| 6,070,366 A | | 6/2000 | Pierson | |
| 6,179,367 B1 | * | 1/2001 | Bowen | E04H 15/06 135/124 |
| 7,380,867 B2 | * | 6/2008 | Waas | B60P 3/341 296/159 |
| D592,270 S | | 5/2009 | Cobb et al. | |
| 7,695,049 B2 | | 4/2010 | Colborne | |
| 7,749,380 B2 | | 7/2010 | Yungner et al. | |
| 8,366,177 B2 | * | 2/2013 | Prusmack | B60P 3/34 135/135 |
| 2004/0261324 A1 | * | 12/2004 | Tewari | E04H 9/16 52/2.18 |

(Continued)

FOREIGN PATENT DOCUMENTS

WO    WO2009005537    1/2009

*Primary Examiner* — Winnie Yip (57) ABSTRACT

An inflatable tent assembly includes a trailer has a pair of wheels, a hitch and a body. The body has a plurality of storage compartments therein. The body has a front end, a back end, a first lateral side and a second lateral side. A generator is coupled to the trailer and the generator is positioned on the body. A blower is positioned in the trailer and the blower is positioned on the body. A tent is removably contained within the tent compartment and the tent is positionable on a support surface. The tent is selectively operationally coupled to the blower such that the blower inflates the tent into a standing position. Thus, the tent may be occupied.

12 Claims, 5 Drawing Sheets

(56) References Cited

U.S. PATENT DOCUMENTS

| | | | |
|---|---|---|---|
| 2010/0230999 A1* | 9/2010 | Setzer | B60P 3/341 296/173 |
| 2011/0210577 A1 | 9/2011 | Cochran et al. | |
| 2012/0192524 A1* | 8/2012 | Streett | C02F 9/00 53/79 |
| 2012/0248818 A1* | 10/2012 | Cochran | B60P 3/341 296/168 |
| 2014/0367991 A1* | 12/2014 | Loranger | B60P 3/341 296/165 |

* cited by examiner

FIG. 5

INFLATABLE TENT ASSEMBLY

BACKGROUND OF THE DISCLOSURE

Field of the Disclosure

The disclosure relates to tent devices and more particularly pertains to a new tent device for providing temporary, temperature controlled shelter.

SUMMARY OF THE DISCLOSURE

An embodiment of the disclosure meets the needs presented above by generally comprising a trailer has a pair of wheels, a hitch and a body. The body has a plurality of storage compartments therein. The body has a front end, a back end, a first lateral side and a second lateral side. A generator is coupled to the trailer and the generator is positioned on the body. A blower is positioned in the trailer and the blower is positioned on the body. A tent is removably contained within the tent compartment and the tent is positionable on a support surface. The tent is selectively operationally coupled to the blower such that the blower inflates the tent into a standing position. Thus, the tent may be occupied.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 5 thereof, a new tent device embodying the principles and concepts of an embodiment of the disclosure and generally designated by the reference numeral 10 will be described.

As best illustrated in FIGS. 1 through 5, the inflatable tent assembly 10 generally comprises a trailer 12 that has a pair of wheels 14, a hitch 16 and a body 18. The body 18 has a plurality of storage compartments 20 therein. The body 18 has a front end 22, a back end 24, a first lateral side 26 and a second lateral side 28. The plurality of storage compartments 20 includes a tent compartment 30, a pole compartment 32 and a hose compartment 34.

Figure 1:
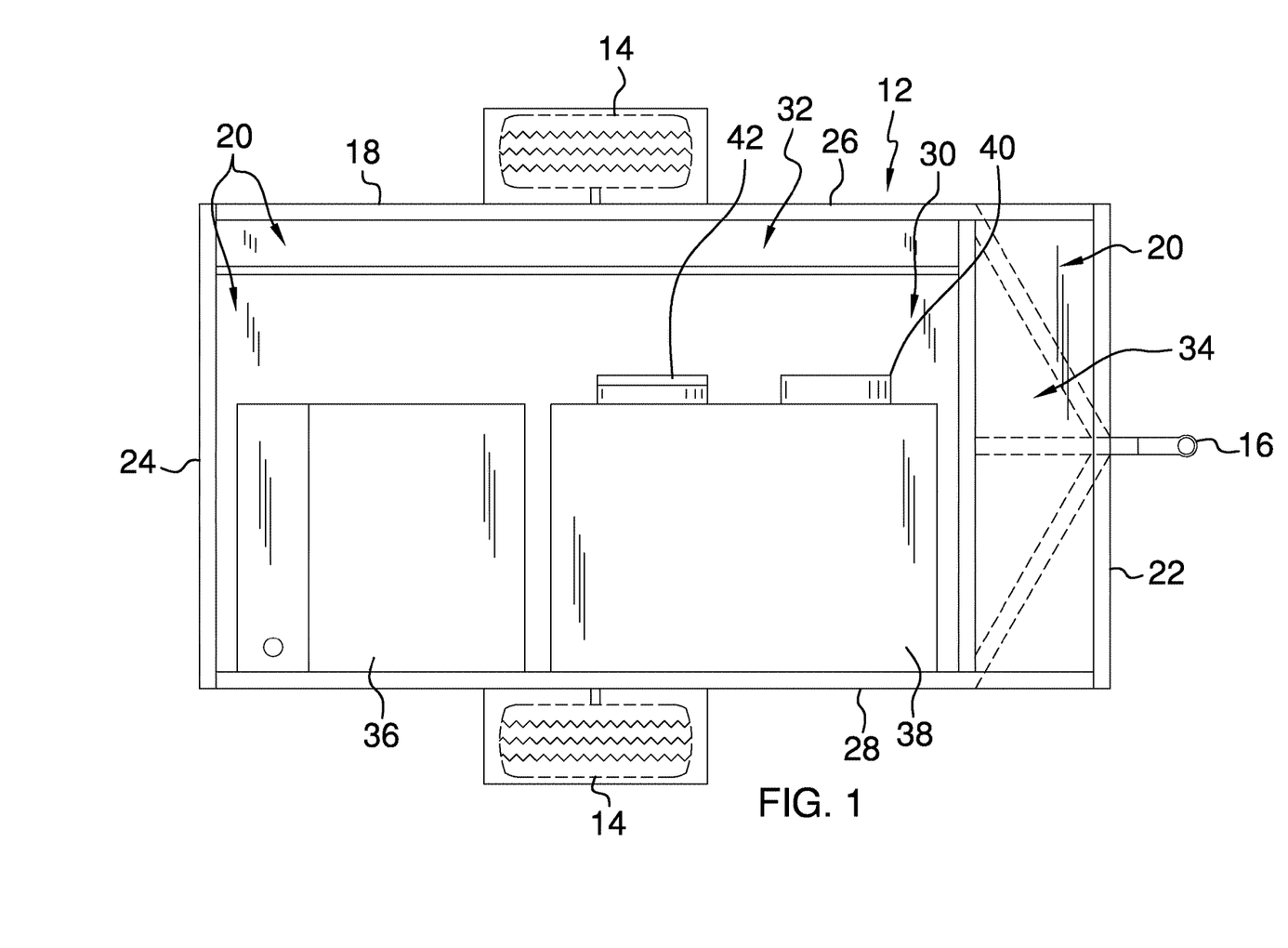
FIG. 1 is a top view of trailer of an inflatable tent assembly according to an embodiment of the disclosure.
Figure 2:
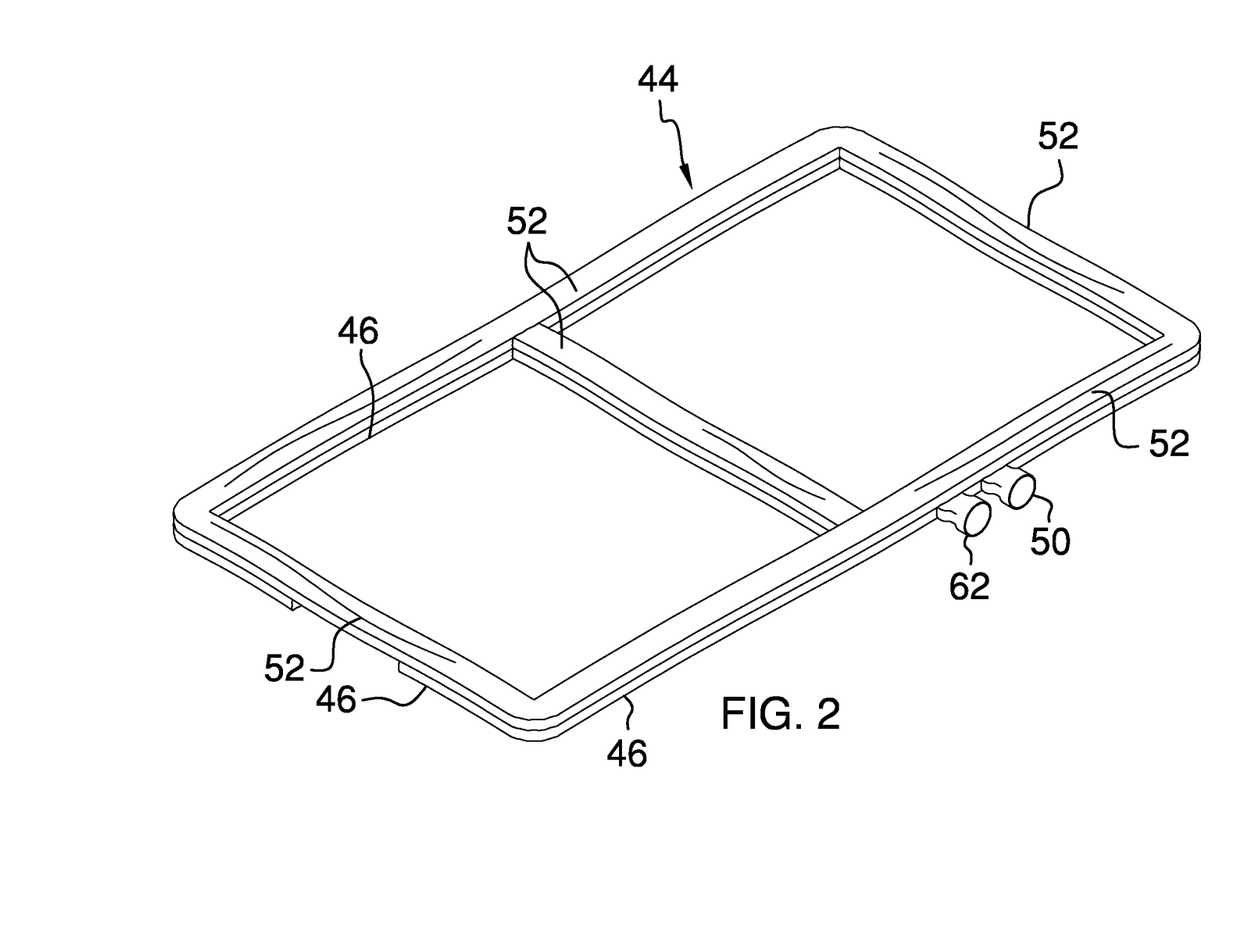
FIG. 2 is a top perspective view of tent of an embodiment of the disclosure.
Figure 3:
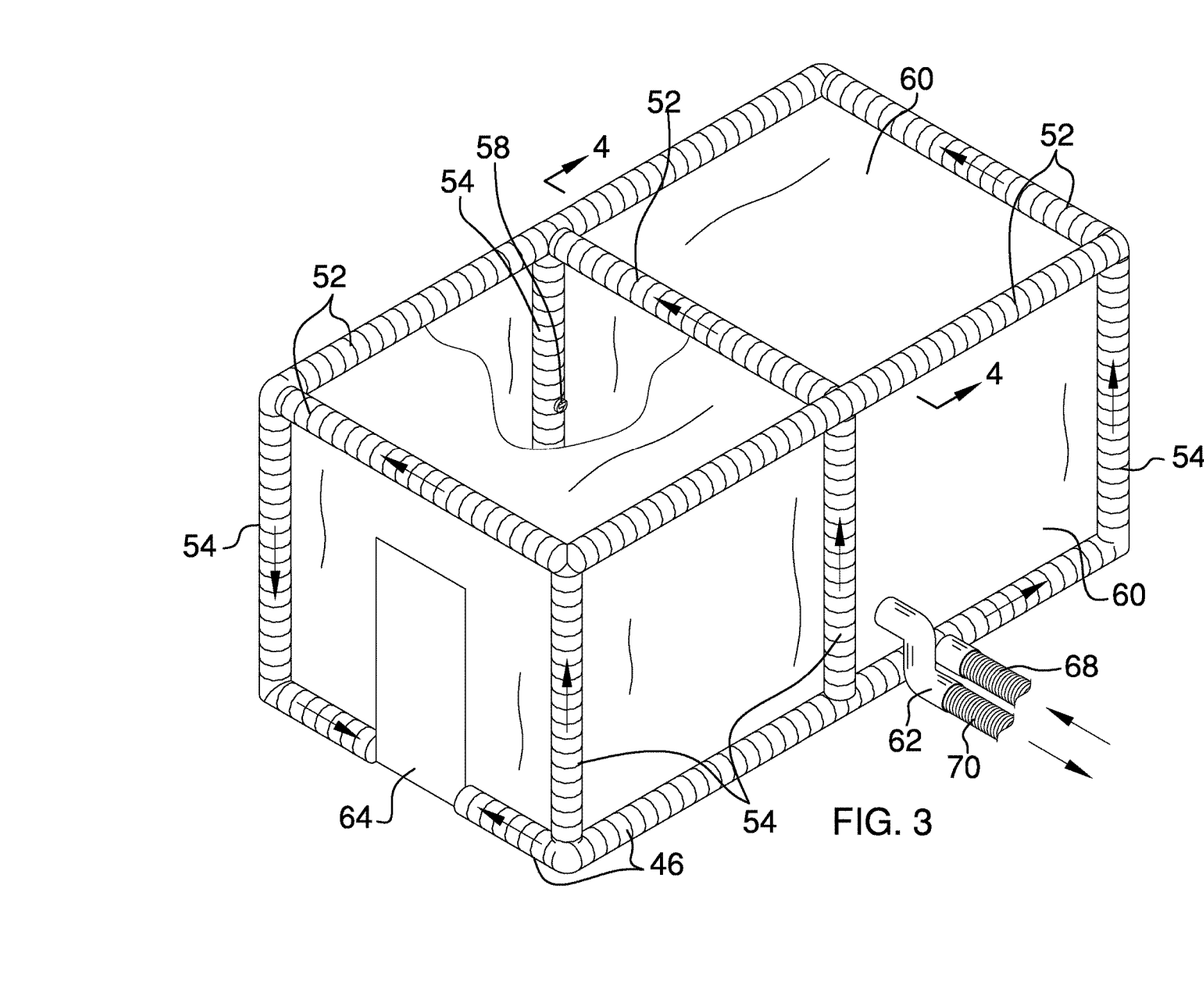
FIG. 3 is a right side perspective view of a tent of an embodiment of the disclosure.
Figure 4:
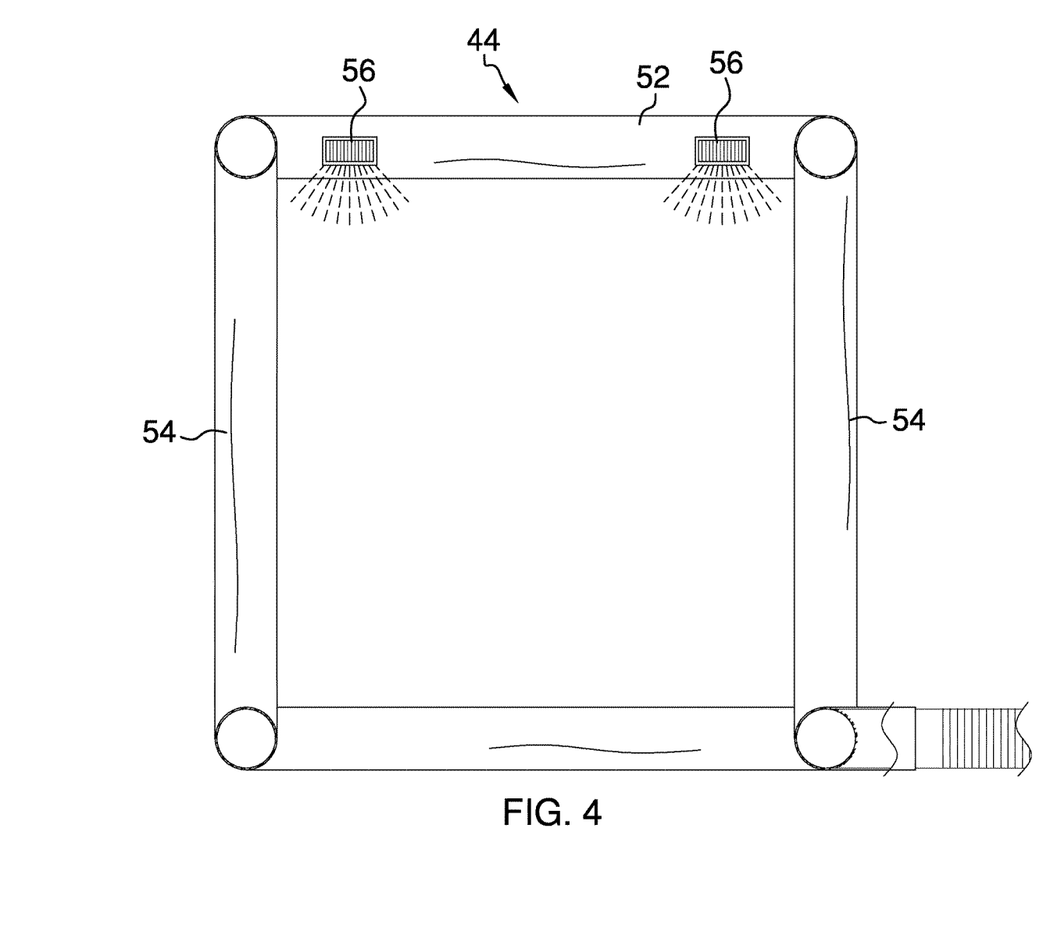
FIG. 4 is a cross sectional view taken along line 4-4 of FIG. 3 of an embodiment of the disclosure.

The tent compartment 30 may extend between the front end 22 and the back end 24. The tent compartment 30 may be positioned proximate the first lateral side 26. The pole compartment 30 may extend between the front end 22 and the back end 24. The pole compartment 30 may be positioned between the tent compartment 30 and the first lateral side 26. The hose compartment 34 may extend between the first lateral side 26 and the second lateral side 28. The hose compartment 34 may be coextensive with the front end 22.

A generator 36 is coupled to the trailer 12. The generator 36 is positioned on the body 18 and the generator 36 may be positioned between the tent compartment 30 and the second lateral side 28. The generator 36 may be positioned adjacent to the back end 24 and the generator 36 may be a gas powered generator or the like utilized in the generation of electrical power.

A blower 38 is positioned in the trailer 12 and the blower 38 is positioned on the body 18. The blower 38 may positioned between the generator 36 and the hose compartment 34. The blower 38 has an exhaust 40 and an intake 42 and the blower 38 urges air outwardly through the exhaust 40. The blower 38 draws air inwardly through the intake 42 and the blower 38 is electrically coupled to the generator 36. The blower 38 may be an HVAC unit or the like that is capable of both selectively cooling and heating the air urged outwardly through the exhaust 40.

A tent 44 is removably contained within the tent compartment 30 and the tent 44 is positionable on a support surface 46. The support surface 46 may be ground. The tent 44 is selectively operationally coupled to the blower 38 such that the blower 38 inflates the tent 44 into a standing position. Thus, the tent 44 may be occupied.

The tent 44 comprises a plurality of lower tubes 48 and each of the lower tubes 48 is substantially hollow. Each of the lower tubes 48 is fluidly coupled together and arranged to form a rectangle. One of the lower tubes 48 has an inlet 50 that is fluidly coupled thereto. The inlet 50 is selectively fluidly coupled to the exhaust 40 of the blower 38 thereby facilitating the blower 38 to inflate the lower tubes 48.

A plurality of upper tubes 52 is provided and each of the upper tubes 52 is substantially hollow. Each of the upper tubes 52 is fluidly coupled together and arranged to form a rectangle. A plurality of upright tubes 54 is provided and each of the upright tubes 54 is substantially hollow. Each of the upright tubes 54 is fluidly coupled between the lower tubes 48 and the upper tubes 52 thereby facilitating each of the upper tubes 52 and each of the upright tubes 52 to be inflated.

The upright tubes 54 are spaced apart from each other and distributed around the tent 44. Each of the upper tubes 52 lies on associated ones of the lower tubes 48 when tent 44 is deflated. Each of the upper tubes 52 is spaced from each of the lower tubes 48 when the tent 44 is inflated. Each of the upper tubes 52 has at least one vent 56 that is fluidly coupled thereto. Thus, each of the at least one vents 56 releases air into the tent 44 when the blower 38 inflates the tent 44 thereby facilitating the blower 38 to control a temperature within the tent 44.

A thermostat 58 is provided and the thermostat 58 is coupled to one of the upright tubes 54. The thermostat 58 is electrically coupled to the blower 38 through the use of a conductor or other conventional means of electrically coupling a thermostat 58 to a blower 38. Thus, the thermostat 58 actuates the blower 38 to selectively heat or cool the air urged into the tent 44. The thermostat 58 may be a thermostat of any conventional design utilized in the control of HVAC operation.

A membrane 60 extends between each of the upright tubes 54 and each of the upper tubes 52. The membrane 60 has an outlet 62 that is fluidly coupled thereto. The outlet 62 is fluidly coupled to the intake 42 of the blower 38. The membrane 60 has a doorway 64 extending therethrough. The doorway 64 is positioned between an associated pair of the upright tubes 54 such that the doorway 64 may facilitate entry into the tent 44.

A plurality of poles 66 is provided and each of the poles 66 is contained within the pole compartment 32. Each of the poles 66 is selectively coupled to the tent 44 when the tent 44 is inflated such that each of the poles 66 extends laterally between the upper tubes 52. Each of the poles is arched along a length of each of the poles. Thus, the poles 66 urge the membrane 60 upwardly between the upper tubes 52 thereby inhibiting precipitation from collecting on the membrane 60 between the upper tubes 52. The poles 66 may be spaced apart from each other and distributed along the tent 44 when the poles 66 are coupled to the tent 44.

An exhaust hose 68 is provided and the exhaust hose 68 may be contained within the hose compartment 34. The exhaust hose 68 is selectively fluidly coupled between the exhaust 40 on the blower 38 and the inlet 50 on the associated one of lower tubes 48 thereby facilitating the blower 38 to inflate the tent 44. An intake hose 70 is provided and the intake hose 70 is contained within the hose compartment 34. The intake hose 70 is selectively fluidly coupled between the intake 42 on the blower 38 and the outlet 62 on the membrane 60. A plurality of support wires 72 may be provided and each of the support wires 72 may be coupled between the tent 44 and the support surface 46. Thus, the support wires 72 retain the tent 44 in a stationary position when the tent 44 is inflated.

Figure 5:
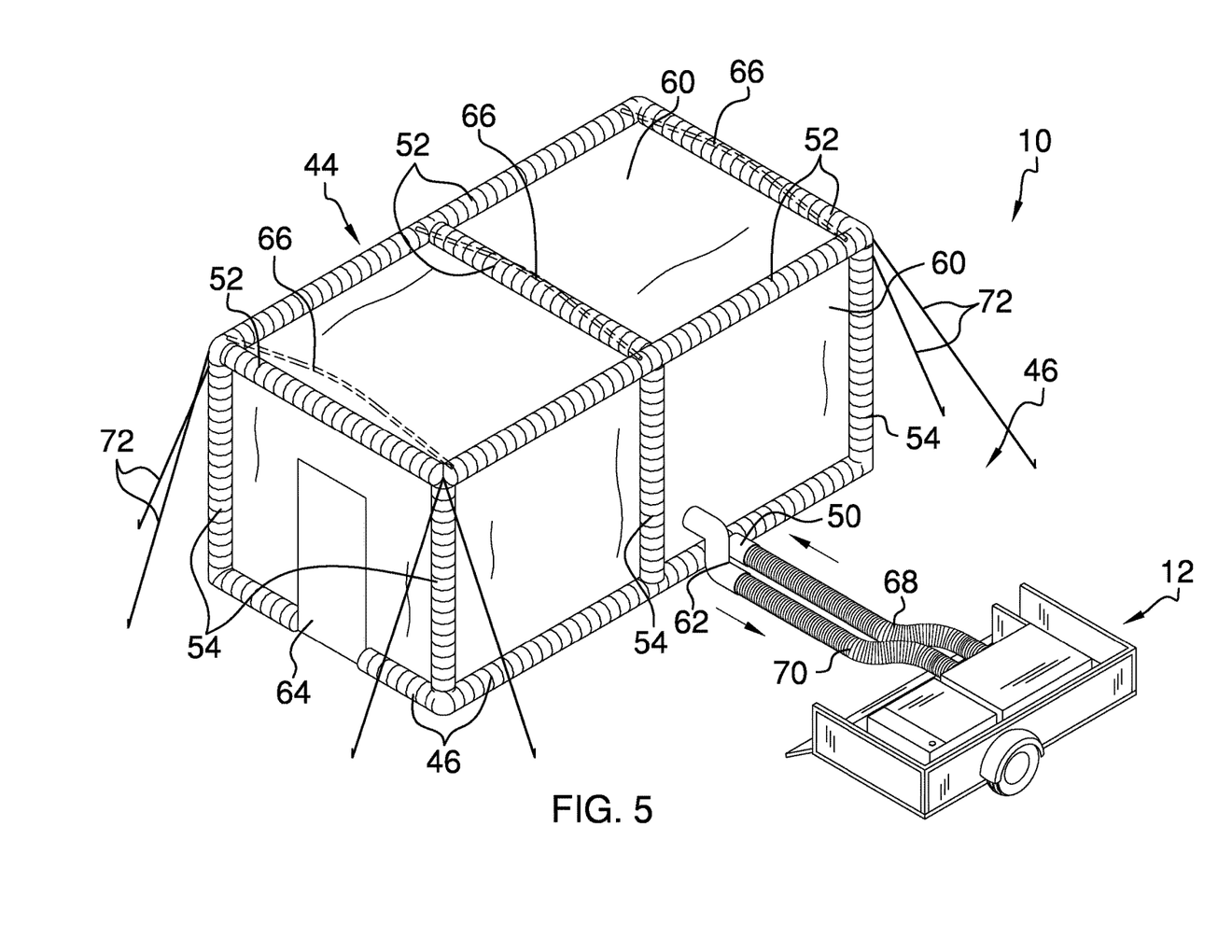
FIG. 5 is a perspective in-use view of an embodiment of the disclosure.

In use, the tent 44 is removed from the tent compartment 30 and the tent 44 is laid upon the support surface 46. The exhaust hose 68 is coupled between the blower 38 and the tent 44 and the intake hose 70 is coupled between the blower 38 and the tent 44. The generator 36 is started and the blower 38 is actuated to inflate the tent 44. The thermostat 58 is set to a selected temperature thereby facilitating the blower 38 to heat or cool the air urged into the tent 44. Thus, the blower 38 maintains the interior of the tent 44 at a desired temperature.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An inflatable tent assembly configured to be selectively inflated to a standing position, said assembly comprising:
    a trailer having a pair of wheels, a hitch and a body, said body having a plurality of storage compartments therein, said storage compartments including a tent compartment, said body having a front end, a back end, a first lateral side and a second lateral side;
    a generator being coupled to said trailer, said generator being positioned on said body;
    a blower being positioned in said trailer, said blower being positioned on said body, said blower having an exhaust and an intake, each of said exhaust and said intake facing said first lateral side of said trailer, said first lateral side of said trailer being positionable in an open position extending down and away from said second lateral side wherein said exhaust and said intake are exposed to facilitate connection of said exhaust and said intake to an exhaust hose and an intake hose;
    a tent being removably contained within said tent compartment, said tent being positionable on a support surface, said tent being selectively operationally coupled to said blower such that said blower inflates said tent into a standing position wherein said tent is configured to be occupied;
    said plurality of storage compartments further includes a pole compartment and a hose compartment;
    wherein said tent compartment extends between said front end and said back end, said tent compartment being positioned proximate said first lateral side;
    wherein said pole compartment extends between said front end and said back end, said pole compartment being positioned between said tent compartment and said first lateral side; and
    wherein said hose compartment extends between said first lateral side and said second lateral side, said hose compartment being coextensive with said front end.

2. The assembly according to claim 1, wherein said generator is positioned between said tent compartment and said second lateral side, said generator being positioned adjacent to said back end.

3. The assembly according to claim 1, wherein said blower being positioned between said generator and said hose compartment, said blower being configured to urge air outwardly through said exhaust, said blower being configured to draw air inwardly through said intake, said blower being electrically coupled to said generator.

4. The assembly according to claim 1, wherein said tent comprises a plurality of lower tubes, each of said lower tubes being substantially hollow, each of said lower tubes being fluidly coupled together and arranged to form a rectangle, one of said lower tubes having an inlet being fluidly coupled thereto, said inlet being selectively fluidly coupled to an exhaust of said blower thereby facilitating said blower to inflate said lower tubes.

5. The assembly according to claim 1, wherein said tent comprises a plurality of upper tubes, each of said upper tubes being substantially hollow, each of said upper tubes being fluidly coupled together and arranged to form a rectangle.

6. The assembly according to claim 1, wherein said tent comprises:
    a plurality of upper tubes;
    a plurality of lower tubes; and a plurality of upright tubes, each of said upright tubes being substantially hollow, each of said upright tubes being fluidly coupled between said lower tubes and said upper tubes thereby facilitating each of said upper tubes and each of said upright tubes to be inflated, said upright tubes being spaced apart from each other and distributed around said tent.

7. The assembly according to claim 6, wherein:
each of said upper tubes lies on associated ones of said lower tubes when tent is deflated, each of said upper tubes being spaced from each of said lower tubes when said tent is inflated; and
each of said upper tubes having a vent being fluidly coupled thereto wherein each of said vents is configured to release air into said tent when said blower inflates said tent thereby facilitating said blower to control a temperature within said tent.

8. The assembly according to claim 1, wherein said tent comprises:
a plurality of upright tubes;
a plurality of upper tubes;
a membrane extending between each of said upright tubes and each of said upper tubes;
said membrane having an outlet being fluidly coupled thereto, said outlet being fluidly coupled to an intake of said blower; and
said membrane having a doorway extending therethrough, said doorway being positioned between an associated pair of said upright tubes wherein said doorway is configured to facilitate entry into said tent.

9. The assembly according to claim 1, wherein said tent includes:
a plurality of upper tubes; and
a plurality of poles, each of said poles being contained within a pole compartment, each of said poles being selectively coupled to said tent when said tent is inflated such that each of said poles extends laterally between said upper tubes thereby facilitating said poles to retain said tent in a substantially rectangular shape when said tent is inflated.

10. The assembly according to claim 1, further comprising said exhaust hose being contained within a hose compartment, said exhaust hose being selectively fluidly coupled between said blower exhaust and an inlet thereby facilitating said blower to inflate said tent.

11. The assembly according to claim 1, further comprising said intake hose being contained within a hose compartment, said intake hose being selectively fluidly coupled between said intake on said blower and an outlet on a membrane.

12. An inflatable tent assembly configured to be selectively inflated to a standing position, said assembly comprising:
a trailer having a pair of wheels, a hitch and a body, said body having a plurality of storage compartments therein, said body having a front end, a back end, a first lateral side and a second lateral side, said plurality of storage compartments comprising a tent compartment, a pole compartment and a hose compartment, said tent compartment extending between said front end and said back end, said tent compartment being positioned proximate said first lateral side, said pole compartment extending between said front end and said back end, said pole compartment being positioned between said tent compartment and said first lateral side, said hose compartment extending between said first lateral side and said second lateral side, said hose compartment being coextensive with said front end;

a generator being coupled to said trailer, said generator being positioned on said body, said generator being positioned between said tent compartment and said second lateral side, said generator being positioned adjacent to said back end;
a blower being positioned in said trailer, said blower being positioned on said body, said blower being positioned between said generator and said hose compartment, said blower having an exhaust and an intake, each of said exhaust and said intake facing said first lateral side of said trailer, said first lateral side of said trailer being positionable in an open position extending down and away from said second lateral side wherein said exhaust and said intake are exposed to facilitate connection of said exhaust and said intake to an exhaust hose and an intake hose, said blower being configured to urge air outwardly through said exhaust, said blower being configured to draw air inwardly through said intake, said blower being electrically coupled to said generator;
a tent being removably contained within said tent compartment, said tent being positionable on a support surface, said tent being selectively operationally coupled to said blower such that said blower inflates said tent into a standing position wherein said tent is configured to be occupied, said tent comprising:
a plurality of lower tubes, each of said lower tubes being substantially hollow, each of said lower tubes being fluidly coupled together and arranged to form a rectangle, one of said lower tubes having an inlet being fluidly coupled thereto, said inlet being selectively fluidly coupled to said exhaust of said blower thereby facilitating said blower to inflate said lower tubes,
a plurality of upper tubes, each of said upper tubes being substantially hollow, each of said upper tubes being fluidly coupled together and arranged to form a rectangle,
a plurality of upright tubes, each of said upright tubes being substantially hollow, each of said upright tubes being fluidly coupled between said lower tubes and said upper tubes thereby facilitating each of said upper tubes and each of said upright tubes to be inflated, said upright tubes being spaced apart from each other and distributed around said tent, each of said upper tubes lying on associated ones of said lower tubes when tent is deflated, each of said upper tubes being spaced from each of said lower tubes when said tent is inflated, each of said upper tubes having a vent being fluidly coupled thereto wherein each of said vents is configured to release air into said tent when said blower inflates said tent thereby facilitating said blower to control a temperature within said tent,
a membrane extending between each of said upright tubes and each of said upper tubes, said membrane having an outlet being fluidly coupled thereto, said outlet being fluidly coupled to said intake of said blower, said membrane having a doorway extending therethrough, said doorway being positioned between an associated pair of said upright tubes wherein said doorway is configured to facilitate entry into said tent, and
a plurality of poles, each of said poles being contained within said pole compartment, each of said poles being selectively coupled to said tent when said tent is inflated such that each of said poles extends laterally between said upper tubes thereby facilitating said poles to retain said tent in a substantially rectangular shape when said tent is inflated;

said exhaust hose being contained within said hose compartment, said exhaust hose being selectively fluidly coupled between said exhaust on said blower and said inlet thereby facilitating said blower to inflate said tent; and said intake hose being contained within said hose compartment, said intake hose being selectively fluidly coupled between said intake on said blower and said outlet on said membrane.

* * * * *